(12) United States Patent
Chen et al.

(10) Patent No.: US 11,148,952 B1
(45) Date of Patent: Oct. 19, 2021

(54) METHOD FOR PREPARING HYDROPHOBIC MOLECULAR SIEVES FROM BOROSILICATE AND ZINCOSILICATE MOLECULAR SIEVES

(71) Applicant: CHEVRON U.S.A. INC., San Ramon, CA (US)

(72) Inventors: Cong-Yan Chen, Kensington, CA (US); Stacey Ian Zones, San Francisco, CA (US); Tracy Margaret Davis, Novato, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/176,636

(22) Filed: Feb. 16, 2021

Related U.S. Application Data

(60) Provisional application No. 63/028,030, filed on May 21, 2020.

(51) Int. Cl.
| | | |
|---|---|---|
| *C01B 39/02* | (2006.01) | |
| *B01J 37/00* | (2006.01) | |
| *C01B 37/00* | (2006.01) | |

(52) U.S. Cl.
CPC .......... *C01B 37/007* (2013.01); *C01B 37/005* (2013.01); *C01B 39/026* (2013.01); *C01P 2002/30* (2013.01); *C01P 2002/72* (2013.01)

(58) Field of Classification Search
CPC .... C01B 37/005; C01B 37/007; C01B 39/026
See application file for complete search history.

(56) References Cited

U.S. PATENT DOCUMENTS

| | | |
|---|---|---|
| 6,468,501 B1 | 10/2002 | Chen et al. |
| 6,790,433 B2 | 9/2004 | Chen et al. |
| 7,011,802 B2 | 3/2006 | Jones et al. |

OTHER PUBLICATIONS

Takahiko Takewaki, Larry W. Beck, and Mark E. Davis, "Zincosilicate CIT-6: A Precursor to a Family of *BEA-Type Molecular Sieves" J. Phys. Chem. B 1999, 103, 14, 2674-2679 (Year: 1999).*

C.W. Jones, S-J. Hwang, T. Okubo and M.E. Davis "Synthesis of Hydrophobic Molecular Sieves by Hydrothermal Treatment with Acetic Acid" Chem. Mater. 2001, 13, 1041-1050.

(Continued)

*Primary Examiner* — David M Brunsman

(57) ABSTRACT

A method of increasing hydrophobicity of a molecular sieve is provided. The method includes: (a) providing a metallosilicate molecular sieve having a framework consisting of oxides of silicon (Si) and a metal (M), wherein M is boron or zinc; (b) contacting the metallosilicate molecular sieve with a liquid aqueous system, thereby obtaining a demetallated molecular sieve having silanol nests and empty framework sites; and (c) thermally treating the demetallated molecular sieve, thereby obtaining a thermally-treated molecular sieve, wherein the thermally-treated molecular sieve (i) retains the three-dimensional framework structure of the metallosilicate molecular sieve and (ii) has a higher Si/M molar ratio as compared to the metallosilicate molecular sieve.

18 Claims, 10 Drawing Sheets

(56) References Cited

OTHER PUBLICATIONS

C-Y. Chen and S.I. Zones "Post-synthetic Treatment and Modification of Zeolites". In J. Cejka, A. Corma and S. Zones (Eds), "Zeolites and Catalysis—Synthesis, Reactions and Applications" (Wiley—VCH, 2010, vol. 1, 155-170).
K. Iyoki, K. Kikumasa, T. Onishi, Y. Yonezawa, A. Chokkalingam, Y. Yanaba, T. Matsumoto, R. Osuga, S.P. Elangovan, J.N. Kondo, A. Endo, T. Okubo and T. Wakihara "Extremely Stable Zeolites Developed via Designed Liquid-Mediated Treatment" J. Am. Chem. Soc. 2020, 142, 3931-3938.

\* cited by examiner

METHOD FOR PREPARING HYDROPHOBIC MOLECULAR SIEVES FROM BOROSILICATE AND ZINCOSILICATE MOLECULAR SIEVES

CROSS-REFERENCE TO RELATED APPLICATIONS

This application claims priority to and the benefit of U.S. Provisional Application Ser. No. 63/028,030, filed May 21, 2020.

FIELD

The present disclosure relates to a method for the preparation of hydrophobic molecular sieves from their respective parent borosilicate and zincosilicate molecular sieves.

BACKGROUND

Molecular sieves are a commercially important class of materials that have distinct crystal structures with defined pore structures that are shown by distinct X-ray diffraction (XRD) patterns and have specific chemical compositions. The crystal structure defines cavities and pores that are characteristic of the specific type of molecular sieve. Molecular sieves often find particular utility in adsorption, ion-exchange, gas separation, and catalyst applications.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three-letter code and are described in the "*Atlas of Zeolite Framework Types*" by Ch. Baerlocher, L. B. McCusker and D. H. Olson (Elsevier, Sixth Revised Edition, 2007).

Hydrophobic, all-silica molecular sieves are useful materials primarily because of their organophilic character and their thermal and hydrothermal stability. Pure-silica molecular sieves can be synthesized hydrothermally using organotemplates to kinetically steer their synthesis to the desired products. However, in many cases, the presence (or absence) of tetrahedral, non-silicon atoms in the synthesis such as boron or aluminum causes the formation of different crystalline phase or prevents the formation of a crystalline phase entirely. For example, the use of the N,N,N-trimethyl-2-adamantanammonium cation as an organotemplate gives SSZ-24 (AFI framework type) when boron is included in the synthesis gel, and SSZ-13 (CHA framework type), SSZ-23 (STT framework type) or SSZ-25 (MWW framework type) when varying amounts of aluminum are included in the synthesis. In the absence of any tetrahedral, non-silicon atoms in the synthesis gel, no crystalline products are formed. Situations like this invariably arise in molecular sieve synthesis and, as a result, many framework topologies can only be synthesized in a narrow range of framework compositions.

To access other framework compositions, various strategies have been employed. Dealumination of aluminosilicate molecular sieves is commonly used to synthesize high-silica or pure-silica molecular sieves. Many dealumination techniques have been developed over the years including steaming, acid leaching, and treatment with a hexafluorosilicate salt such as alkali metal hexafluorosilicates and ammonium hexafluorosilicate. Furthermore, high-silica or dealuminated zeolites are further treated via designed liquid-mediated using aqueous mixture of ammonium fluoride and tetraethylammonium hydroxide to reduce the defect sites and improve the hydrophobicity and thermal stability of the zeolites.

Another route to both all-silica and heteroatom-containing framework molecular sieve compositions is by using borosilicate or zincosilicate molecular sieves as precursor species. Removal of boron or zinc from the framework of molecular sieves requires significantly milder conditions than does the removal of aluminum. Vacancies with tetrahedral coordination can then be repopulated in a subsequent step with a variety of species including silicon, titanium, and aluminum, among others, for example, via treatment with acetic acid.

When all-silica molecular sieves can be directly synthesized, the synthesis often requires the presence of fluoride ions as a mineralizer, which in commercial scale operations is disadvantageous in that it may lead to extra safety and cost considerations.

Accordingly, a need exists for new, simple, environmentally benign and economic methods for preparing hydrophobic molecular sieves.

SUMMARY

In one aspect, there is provided a method of increasing hydrophobicity of a molecular sieve, the method comprising the steps of: (a) providing a metallosilicate molecular sieve having a three-dimensional framework structure comprising oxides of silicon (Si) and a metal (M), wherein M is boron or zinc; (b) contacting the metallosilicate molecular sieve with a liquid aqueous system, thereby obtaining a demetallated molecular sieve having silanol nests and empty framework sites; and (c) thermally treating the demetallated molecular sieve, thereby obtaining a thermally-treated molecular sieve, wherein the thermally-treated molecular sieve (i) retains the three-dimensional framework structure of the metallosilicate molecular sieve and (ii) has a higher Si/M molar ratio as compared to the metallosilicate molecular sieve.

DETAILED DESCRIPTION

Definitions

Figure 1:
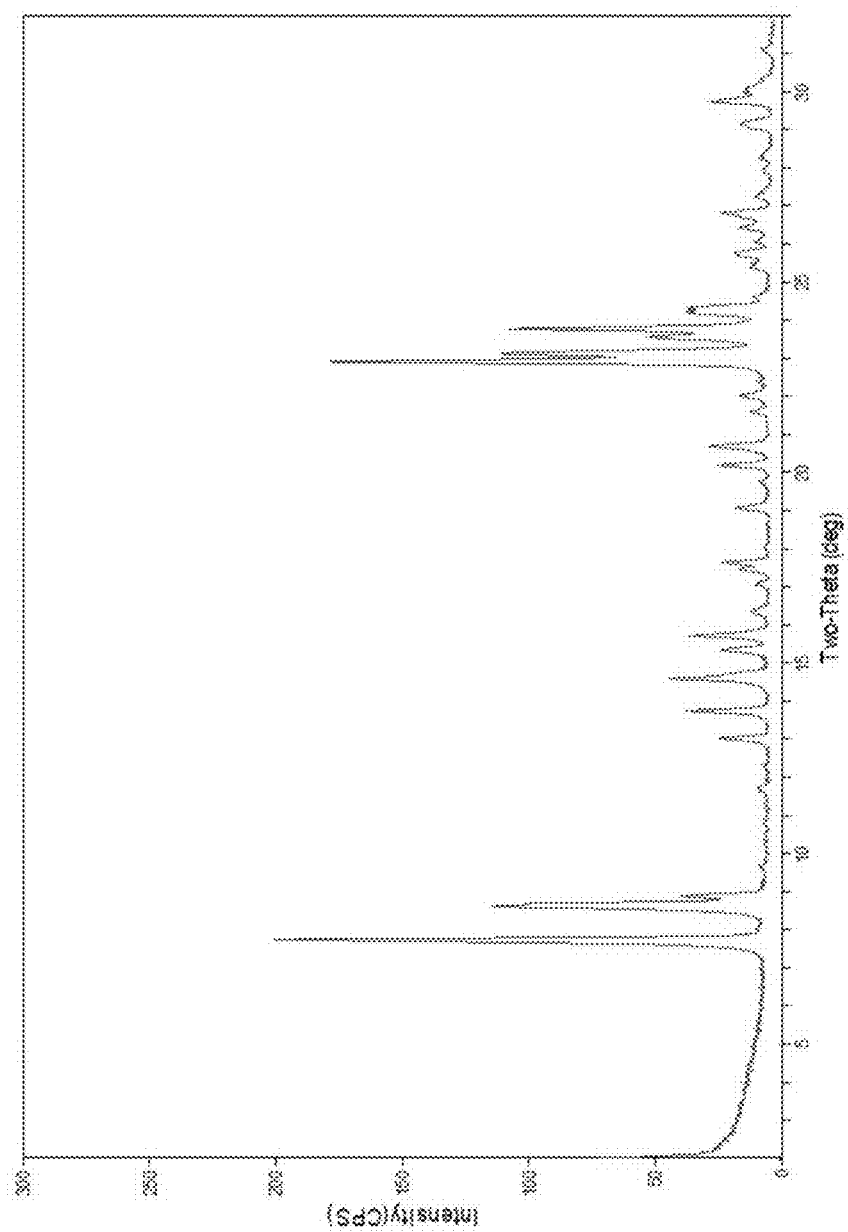
FIG. 1 shows a powder X-ray diffraction (XRD) pattern of deboronated ZSM-5 prepared according to Example 1.

The term "framework" has the meaning described in the "*Atlas of Zeolite Framework Types*" by Ch. Baerlocher, L. B. McCusker and D. H. Olson (Elsevier, Sixth Revised Edition, 2007).

The term "metallosilicate" refers to a crystalline or quasi-crystalline microporous solid having a framework constructed of silicon and metal oxides (i.e., (i.e., repeating $SiO_4$ and $MO_4$ tetrahedral units, where M is a metal).

The term "borosilicate" refers to a crystalline or quasi-crystalline microporous solid having a framework constructed of repeating $SiO_4$ and $AlO_4$ tetrahedral units. The borosilicate may contain only the named oxides, in which case, it may be described as a "pure borosilicate" or it may contain other oxides as well.

The term "zincosilicate" refers to a crystalline or quasi-crystalline microporous solid having a framework constructed of repeating $SiO_4$ and $ZnO_4$ tetrahedral units. The zincosilicate may contain only the named oxides, in which case, it may be described as a "pure zincosilicate" or it may contain other oxides as well.

The terms "pure silica" and "all-silica" are used as synonyms and refer to a crystalline or quasi-crystalline microporous solid having a framework consisting essentially of repeating $SiO_4$ tetrahedral units. Pure silica molecular sieves are free or essentially free of framework T-atoms other than silicon.

The term "hydrophobicity" refers to the wettability of a material. The degree of hydrophobicity of a molecular sieve material can be determined by measurement of its physical properties (e.g., water vapor uptake) and/or chemical properties (e.g., $SiO_2/B_2O_3$ or $SiO_2/ZnO$ molar ratio).

The term "demetallating" refers to a process whereby at least a portion of the framework metal atoms (e.g., boron, zinc) in a metallosilicate molecular sieve framework are removed.

The term "metal" herein includes the metalloid boron.

Step (a): Providing a Metallosilicate Molecular Sieve

There are no specific restrictions how the metallosilicate molecular sieve is provided. The metallosilicate molecular sieve may be either purchased from a commercial source or prepared according to a suitable synthetic process known in the art. The metallosilicate molecular sieve may be provided in the form a powder or in the form of a spray powder or a spray granulate. The metallosilicate molecular sieve provided may be free or substantially free of an organotemplate.

Generally, no specific restrictions exist which borosilicate molecular is provided in step (a). Representative borosilicate molecular sieves include one or more materials having a framework type selected from ATS, *BEA, CHA, CON, IFR, IFW, IHW, ITE, ITH, ITW, MEL, MFI, MTT, MTW, *MRE, MVY, MWW, NES, RTH, RUT, SEW, SFE, SFF, SFG, SFH, SFN, SFS, *SFV, SSF, SSY,*STO, STT, and *-SVY. The borosilicate molecular sieves may also include one or more materials having a framework structure selected from EMM-25, EMM-30, SSZ-36, SSZ-37, SSZ-43, SSZ-47, SSZ-63, and SSZ-64. In some aspects, the borosilicate molecular sieve may have a framework type selected from IFR (e.g., borosilicate SSZ-42), MEI (e.g., borosilicate ZSM-5), MTW (e.g., borosilicate ZSM-12), SFH (e.g., borosilicate SSZ-53), and *SFV (e.g., borosilicate SSZ-57).

Suitable zincosilicate molecular sieves may include one or materials having a framework type selected from *BEA (CIT-6), IFR (zincosilicate SSZ-42), and VPV (VPI-7).

The boron content of the borosilicate molecular sieve provided in step (a) is not subject to any specific restrictions. In some aspects, the borosilicate molecular sieve provided in step (a) can have a molar ratio of Si/B of at least 2 (e.g., 2 to 36000, 2 to 18000, 2 to 1000, 2 to 500, 2 to 100, 3 to 18000, 3 to 1000, 3 to 500, 3 to 100, 4 to 36000, 4 to 18000, 4 to 1000, 4 to 500, 4 to 100, 5 to 18000, 5 to 1000 to 500, or 5 to 100).

Generally, no specific restrictions exist which zincosilicate molecular is provided in step (a). Representative zincosilicate molecular sieves include materials having a framework type selected from *BEA (e.g., CIT-6), IFR (e.g., zincosilicate SSZ-42), and VPV (e.g., VPI-7). The zincosilicate molecular sieve can have a molar ratio of $SiO_2/ZnO$ of at least 10 (e.g., from 10 to 100).

Step (b): Demetallating the Metallosilicate Molecular Sieve

According to step (b), the metallosilicate molecular sieve is contacted with a liquid aqueous system to provide a demetallated molecular sieve having silanol nests and empty framework sites.

The contacting in step (b) may be performed at a temperature in a range of from 15° C. to 100° C. or more (e.g., 15° C. to 75° C., 15° C. to 50° C., 15° C. to 35° C., 20° C. to 100° C., 20° C. to 75° C., 20° C. to 50° C., or 20° C. to 35° C.). During step (b), the metallosilicate molecular sieve can be treated at two or more different temperatures.

The contacting in step (b) may be performed at atmospheric pressure. By "atmospheric pressure" is meant an earth air pressure wherein no external pressure modifying means is utilized. Generally, unless practiced at extreme earth altitudes, "atmospheric pressure" is about 1 atmosphere (about 14.7 psi or about 101 kPa).

The contacting in step (b) may be performed for a time period of from 0.1 hour to 1 week (e.g., from 12 to 36 hours, or from 18 to 30 hours).

The weight ratio of the liquid aqueous system relative to the metallosilicate molecular sieve in step (b) can be in a range of from 1:1 to 100:1 (e.g., 2:1 to 50:1, 2:1 to 25:1, 2:1 to 15:1, 5:1 to 100:1, 5:1 to 50:1, 5:1 to 25:1, 5:1 to 15:1, 10:1 to 100:1, 10:1 to 50:1, 10:1 to 25:1, or 10:1 to 15:1).

The contacting in (b) can be performed using a liquid aqueous system having a pH of 6.5 or less, and thus, the contacting in step (b) is performed under acidic conditions. The pH of the liquid aqueous system in step (b) can be in a range of from 0 to 6.5 (e.g., from 0 to 6.0, from 0 to 5.5, from 0 to 5.0, from 0 to 4.5, from 0 to 4.0, from 0 to 3.5, from 0 to 3.0, or from 0 to 2.5). The pH is to be understood as being measured with a pH sensitive glass electrode.

Generally, no specific restrictions exist which acidic compounds are comprised in the liquid aqueous system, provided that the preferred pH values of the acidic conditions are achieved. Preferably, the liquid aqueous system in step (b) contains an acidic compound selected from the group consisting of inorganic acids, organic acids and combinations of two or more thereof, preferably from the group consisting of monovalent inorganic acids, divalent inorganic acids, trivalent inorganic acids, C1-C10 monocarboxylic acids, C2-C10 dicarboxylic acids, and combinations of two or more thereof.

Representative inorganic acids include hydrochloric acid, perchloric acid, nitric acid, sulfuric acid, and phosphoric acid.

Suitable C1-C10 monocarboxylic acids include linear or branched, saturated or unsaturated, substituted or unsubstituted C1-C10 aliphatic monocarboxylic acids; saturated or unsaturated, substituted or unsubstituted C4-C10 cycloaliphatic monocarboxylic acids; substituted or unsubstituted C5-C10 aryl monocarboxylic acids; and substituted or unsubstituted C5-C10 alkaryl monocarboxylic acids; and combinations thereof. Representative C1-C10 monocarboxylic acids include formic acid, acetic acid, trifluoroacetic acid, propionic acid, butyric acid, and benzoic acid. Suitable C2-C10 dicarboxylic acids can include linear or branched, saturated or unsaturated, substituted or unsubstituted aliphatic C2-C10 dicarboxylic acids; saturated or unsaturated, substituted or unsubstituted cycloaliphatic C5-C10 dicarboxylic acids; substituted or unsubstituted aryl C5-C10 dicarboxylic acids; substituted or unsubstituted alkaryl C5-C10 dicarboxylic acids; and combinations thereof. Representative C2-C10 dicarboxylic acids include oxalic acid, malonic acid, succinic acid, glutaric acid, fumaric acid, and maleic acid.

In some aspects, under acidic conditions in step (b), the liquid aqueous system comprises, as an acidic compound, hydrochloric acid.

The amounts of the one or more acidic compounds are suitably chosen so that the preferred pH values of the liquid aqueous system are in the above-mentioned ranges of the acidic conditions.

Generally, at least 95 wt. % (e.g., at least at least 96 wt. %, at least 97 wt. %, at least 98 wt. %, at least 99 wt. %, at least 99.5 wt. %, or at least 99.9 wt. %) of the liquid aqueous system consists of water and the acidic compound.

Alternatively, the contacting in step (b) can be performed using a liquid aqueous system having a pH above 8, and thus, the contacting in step (b) is performed under basic conditions. The pH of the liquid aqueous system can be in a range of from 8.5 to 12.0 (e.g., from 8.5 to 11.0, from 9.0 to 12.0, or from 9.0 to 11.0). The pH is understood as being measured with a pH sensitive glass electrode.

Generally, no specific restrictions exist which basic compounds are comprised in the liquid aqueous system, provided that the desired pH values of the basic conditions are achieved. The liquid aqueous system in step (b) can contain a basic compound selected from the group consisting of inorganic bases, organic bases, and combinations of two or more thereof, preferably from the group consisting of monovalent inorganic bases, divalent inorganic bases, trivalent inorganic bases, C1-C10 organic bases, and combinations thereof.

Representative inorganic bases include ammonia, ammonium hydroxide, sodium hydroxide, potassium hydroxide, calcium hydroxide, sodium carbonate, sodium bicarbonate, and any combination thereof.

Suitable C1-C10 organic bases include linear or branched, saturated or unsaturated, substituted or unsubstituted C1-C10 aliphatic bases; saturated or unsaturated, substituted or unsubstituted C5-C10 cycloaliphatic bases, which may comprise at least one heteroatom as a ring member; substituted or unsubstituted C5-C10 aryl bases, which may comprise at least one heteroatom as a ring member; substituted or unsubstituted C5-C10 alkaryl bases, which may comprise at least one heteroatom as a ring member; and combinations thereof, wherein the heteroatom is selected from nitrogen, oxygen, and sulfur. Representative C1-C10 organic bases include sodium ethoxide, sodium acetate, methylamine, imidazole, and histidine.

In some aspects, under basic conditions in step (b), the liquid aqueous system comprises, as a basic compound, ammonia.

The amounts of the one or more basic compounds are suitably chosen so that the preferred pH values of the liquid aqueous system are in the above-mentioned ranges of the basic conditions.

Generally, at least 95 wt. % (e.g., at least at least 96 wt. %, at least 97 wt. %, at least 98 wt. %, at least 99 wt. %, at least 99.5 wt. %, or at least 99.9 wt. %) of the liquid aqueous system consists of water and the basic compound.

After demetallation, the obtained demetallated molecular sieve can be separated from the suspension and recovered by any conventional method (e.g., filtration, centrifugation). The separated demetallated molecular sieve can be subjected to a washing step with a washing agent at a temperature below 100° C. and/or drying. Suitable washing agents include water and alcohols such as methanol, ethanol, and propanol. Drying may be carried out at a temperature of from 75° C. to 200° C. (e.g., from 85° C. to 180° C., or from 95° C. to 150° C.) for a period of from 1 to 100 hours (e.g., from 6 to 36 hours). Drying can take place, for example, in a drying oven (e.g., on metal trays), in a drying drum and/or on belt dryers.

Without being bound by theory, it is believed that demetallation of the molecular sieve in step (b) involves hydrolysis of framework M-O—Si bonds, resulting in (1) the formation of extra-framework metal species, (2) their removal from the zeolite crystals and (3) the formation of vacant silanol nests with Si—O(H) groups that are positioned for the incorporation of other tetrahedral species such as silicon or for annealing via calcination at high temperature to make hydrophobic molecular sieves of the present disclosure.

Step (c): Thermally Treating the Demetallated Molecular Sieve

After step (b), preferably after washing or after drying, more preferably after washing and drying, the demetallated molecular sieve is thermally treated.

The thermal treatment may be performed at a temperature of from 200° C. to 1200° C. (e.g., from 500° C. to 1100° C., or from 700° C. to 1000° C.). The thermal treatment can be conducted for 0.5 to 20 hours (e.g., 3 to 12 hours).

Thermal treatment can be carried out under any suitable gas atmosphere, with air and/or lean air being preferred.

Any apparatus can be used for the thermal treatment, such as a muffle furnace, a rotary furnace and/or a belt calcining furnace.

Without being bound by theory, it is believed that during thermal treating in step (c) Si—OH groups in silanol nest defect sites created during demetallation step (b) are annealed (healed) to form Si—O—Si bonds, leading to the formation of a molecular sieve product having enhanced hydrophobicity.

The resulting thermally treated molecular sieve is more hydrophobic than the metallosilicate molecular sieve provided in step (a) and the demetallated molecular sieve of step (b).

Hydrophobicity of a molecular sieve can be expressed in terms of water vapor uptake. Within the context of the present disclosure, the term "water vapor uptake" refers to a measurement of the potential of a molecular sieve to adsorb water vapor. Water vapor uptake can be expressed as a percent (by weight) of water which is adsorbed or otherwise retained by a molecular sieve when exposed to water vapor under certain measurement conditions. The water vapor uptake of a molecular sieve may be determined by methods known in the art, for example, thermogravimetric analysis (TGA). Within the context of the present disclosure, measurements of water vapor uptake are acquired via TGA under ambient pressure, unless otherwise stated. A molecular sieve which has higher hydrophobicity relative to another molecular sieve will have a lower percentage of water vapor uptake/retention relative to the reference molecular sieve.

In some aspects, the molecular sieve obtained in calcination step (c) has a water vapor uptake of 2.0 wt. % or less (e.g., 1.5 wt. % or less, 1.25 wt. % or less, 1.0 wt. % or less, or 0.75 wt. % or less).

In some aspects, hydrophobicity of a molecular sieve can be expressed in terms of concentration of framework silicon oxide. Within the context of the present disclosure, a molecular sieve which has higher hydrophobicity relative to another molecular sieve will have a higher concentration of framework silicon oxides relative to the reference molecular sieve.

In some aspects, the molecular sieve product obtained in thermal treating step (c) has a molar ratio of Si/M as compared to the metallosilicate molecular sieve, wherein M is boron or zinc. In some aspects, the molecular sieve product obtained in thermal treating step (c) can be in a totally siliceous ("all-silica") form in which detectable metal oxides are absent or essentially absent.

In some aspects, hydrophobicity of a molecular sieve can be expressed in terms of concentration of silanol groups as determined by nuclear magnetic resonance (NMR) or infrared (IR) spectroscopy. Within the context of the present disclosure, a molecular sieve which has higher hydrophobicity relative to another molecular sieve will have a lower concentration of silanol groups relative to the reference molecular sieve.

The molecular sieve obtained in thermal treating step (c) has a powder XRD diffraction pattern that is the same as or consistent with that of the molecular sieve provided in step (a). Demetallation and thermal treating steps (b) and (c) generally result in no notable changes in the powder XRD patterns of the respective samples.

EXAMPLES

The following illustrative examples are intended to be non-limiting.

$SiO_2/B_2O_3$ molar ratios were determined by Inductively Coupled Plasma-Mass Spectrometry (ICP-MS).

Micropore volume was determined from nitrogen adsorption/desorption isotherms measured at −196° C. using a TriStar analyzer available from Micromeritics Instrument Corporation (Norcross, Ga.). Prior to gas adsorption measurements, the molecular sieve samples were degassed at 190° C. for 4 hours.

Water vapor uptake was determined via thermogravimetric analysis (TGA) using a TA Instruments Q5000 analyzer. Samples were exposed to open air in the laboratory at ambient temperature and atmospheric pressure for at least 48 hours. For the TGA measurements, the samples were heated from ambient to 600° C. at 10° C./min and held at 600° C. for 1 hour in a nitrogen flow. The weight loss of the sample due to the dehydration at 600° C. at the end of the TGA measurement relative to its initial weight at the onset of the TGA measurement at ambient temperature was reported as the water vapor uptake. Generally, the lower the water vapor uptake, the higher is the hydrophobicity of the molecular sieve.

Example 1

Preparation of Deboronated ZSM-5

Calcined borosilicate Na/ZSM-5 powder (9.0 g) which was free of organotemplate and had a molar $SiO_2/B_2O_3$ ratio of 53 was treated with aqueous 0.01N HCl (446.5 mL) at room temperature for 48 hours. After treatment, the solid was filtered, washed with deionized water, and air-dried in a vacuum filter at room temperature. The material was then exposed to air at room temperature for at least 48 hours.

The powder XRD pattern of the deboronated product is shown in FIG. 1 and indicated that the deboronated product retained the XRD pattern characteristic of crystalline ZSM-5.

Deboronated ZSM-5 zeolite had a micropore volume of 0.1248 cm$^3$/g and its boron content was below the detection limit (0.01 wt. %).

The deboronated product exhibited a TGA weight loss of 5.6% at 600° C. relative to its initial weight at the onset of the TGA measurement at ambient temperature.

Example 2

Preparation of Hydrophobic all-Silica ZSM-5

The as-prepared deboronated ZSM-5 of Example 1 was calcined inside a muffle furnace under a flow of air heated to 950° C. at a rate of 1° C./minute and held at 950° C. for 5 hours. The material was then exposed to air for at least 48 hours.

Figure 2:
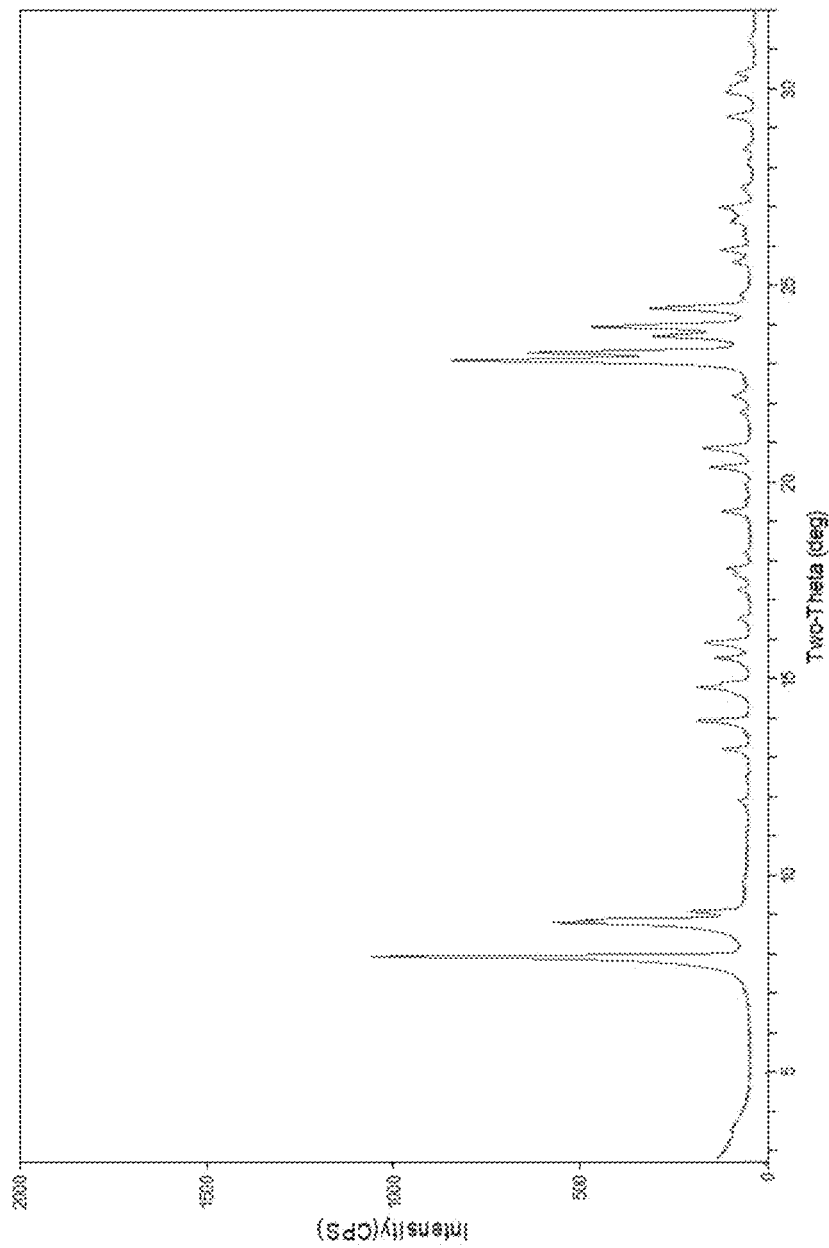
FIG. 2 shows a powder XRD pattern of all-silica ZSM-5 prepared according to Example 2.

The powder XRD pattern of the resulting calcined all-silica product is shown in FIG. 2 and indicated that the resulting calcined all-silica product retained the XRD pattern characteristic of crystalline ZSM-5.

The calcined all-silica ZSM-5 zeolite had a micropore volume of 0.1331 cm$^3$/g.

The calcined all-silica ZSM-5 zeolite exhibited a TGA weight loss of 3.5% at 600° C. relative to its initial weight at the onset of the TGA measurement at ambient temperature, indicating that this material is quite hydrophobic when compared to its parent material—the deboronated ZSM-5 sample of Example 1.

Example 3

Preparation of Deboronated ZSM-12

Calcined borosilicate Na/ZSM-12 powder (8.9 g) which was free of organotemplate and had a molar $SiO_2/B_2O_3$ ratio of 60 was treated with aqueous 0.01N HCl (378.9 mL) at room temperature for 48 hours. After treatment, the solid was filtered, washed with deionized water, and air-dried in a vacuum filter at room temperature. The material was then exposed to air at room temperature for at least 48 hours.

Figure 3:
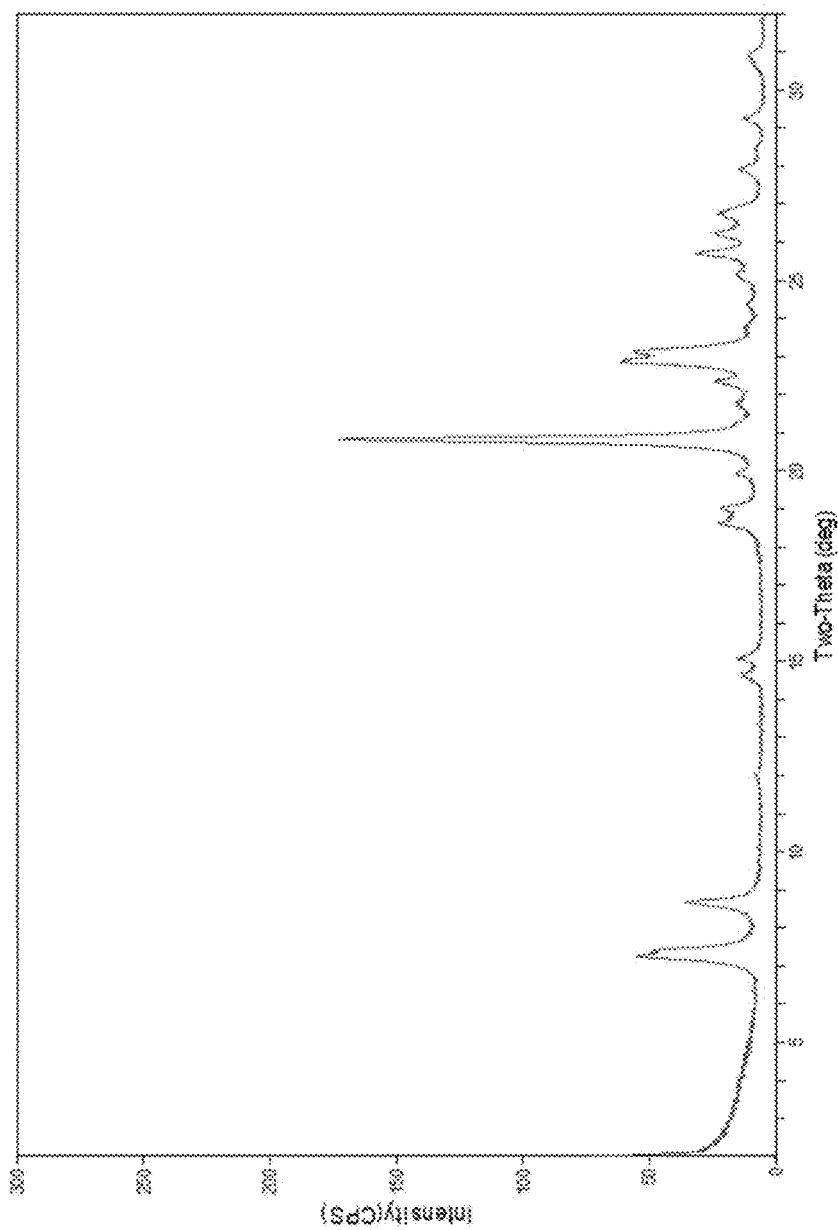
FIG. 3 shows a powder XRD pattern of deboronated ZSM-12 prepared according to Example 3.

The powder XRD pattern of the deboronated product is shown in FIG. 3 and indicated that the deboronated product retained the XRD pattern characteristic of crystalline ZSM-12.

Deboronated ZSM-12 zeolite had a micropore volume of 0.1080 cm$^3$/g and its boron content was below the detection limit (0.01 wt. %).

The deboronated product exhibited a TGA weight loss of 5.2% at 600° C. relative to its initial weight at the onset of the TGA measurement at ambient temperature.

Example 4

Preparation of Hydrophobic all-Silica ZSM-12

The as-prepared deboronated ZSM-12 of Example 3 was calcined inside a muffle furnace under a flow of air heated to 950° C. at a rate of 1° C./minute and held at 950° C. for 5 hours. The material was then exposed to air for at least 48 hours.

Figure 4:
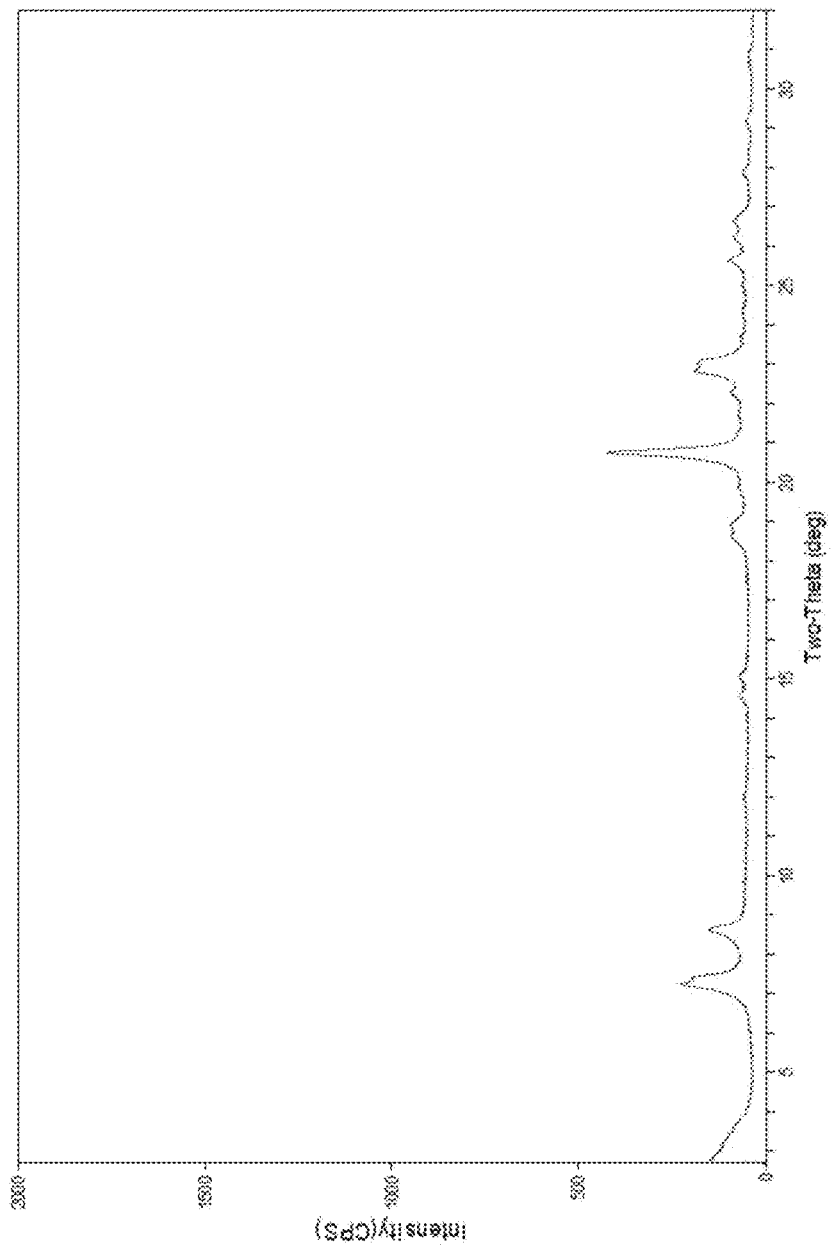
FIG. 4 shows a powder XRD pattern of all-silica ZSM-12 prepared according to Example 4.

The powder XRD pattern of the resulting calcined all-silica product is shown in FIG. 4 and indicated that the resulting calcined all-silica product retained the XRD pattern characteristic of crystalline ZSM-12.

The calcined all-silica ZSM-12 zeolite had a micropore volume of 0.0973 cm$^3$/g.

The calcined all-silica ZSM-12 zeolite exhibited a TGA weight loss of 1.6% at 600° C. relative to its initial weight at the onset of the TGA measurement at ambient temperature, indicating that this material is quite hydrophobic when compared to its parent material—the deboronated ZSM-12 sample of Example 3.

Example 5

Preparation of Deboronated SSZ-42

Calcined borosilicate Na/SSZ-42 powder (10.3 g) which was free of organotemplate and had a molar SiO$_2$/B$_2$O$_3$ ratio of 57 was treated with aqueous 0.01N HCl (515.1 mL) at room temperature for 48 hours. After treatment, the solid was filtered, washed with deionized water, and air-dried in a vacuum filter at room temperature. The material was then exposed to air at room temperature for at least 48 hours.

Figure 5:
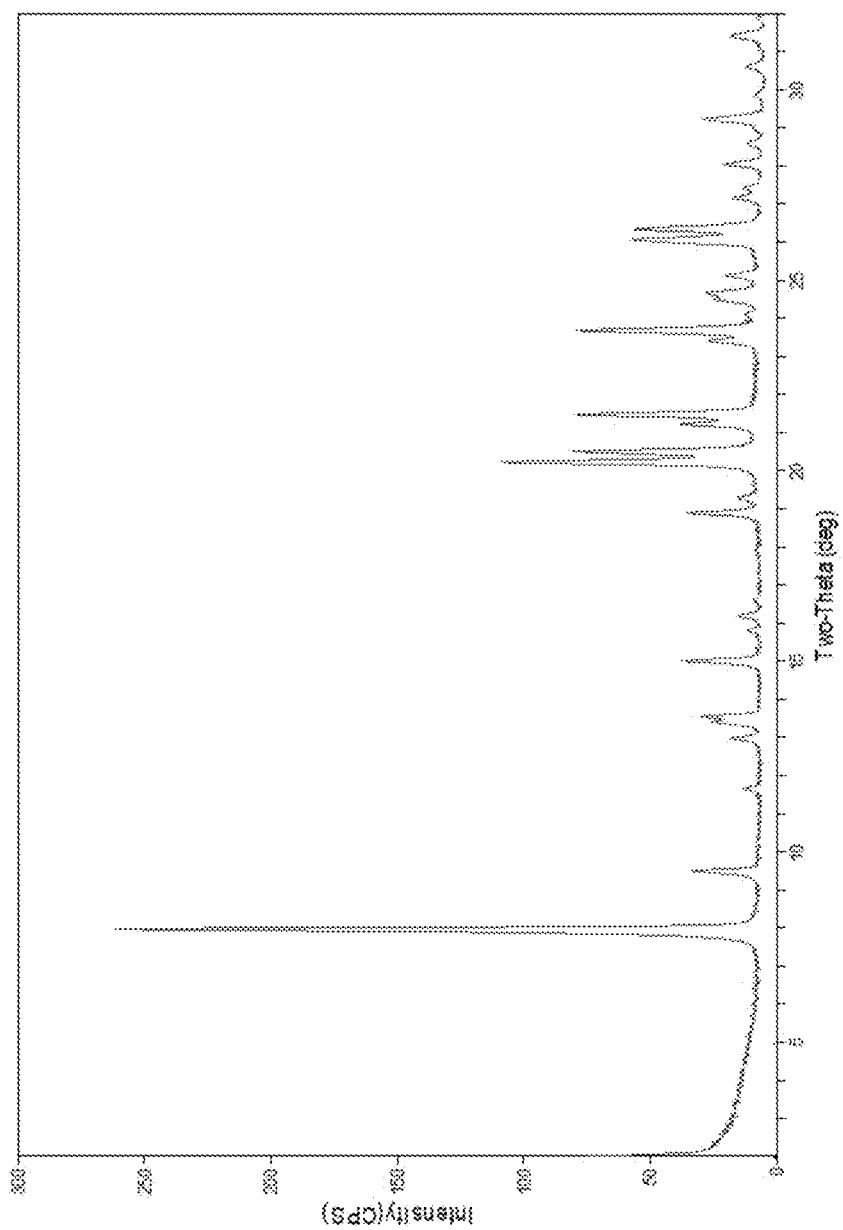
FIG. 5 shows a powder XRD pattern of deboronated SSZ-42 prepared according to Example 5.

The powder XRD pattern of the deboronated product is shown in FIG. 5 and indicated that the deboronated product retained the XRD pattern characteristic of crystalline SSZ-42.

Deboronated SSZ-42 zeolite had a micropore volume of 0.2006 cm$^3$/g and its boron content was below the detection limit (0.01 wt. %).

The deboronated product exhibited a TGA weight loss of 9.6% at 600° C. relative to its initial weight at the onset of the TGA measurement at ambient temperature.

Example 6

Preparation of Hydrophobic all-Silica SSZ-42

The as-prepared deboronated SSZ-42 of Example 5 was calcined inside a muffle furnace under a flow of air heated to 950° C. at a rate of 1° C./minute and held at 950° C. for 5 hours. The material was then exposed to air for at least 48 hours.

Figure 6:
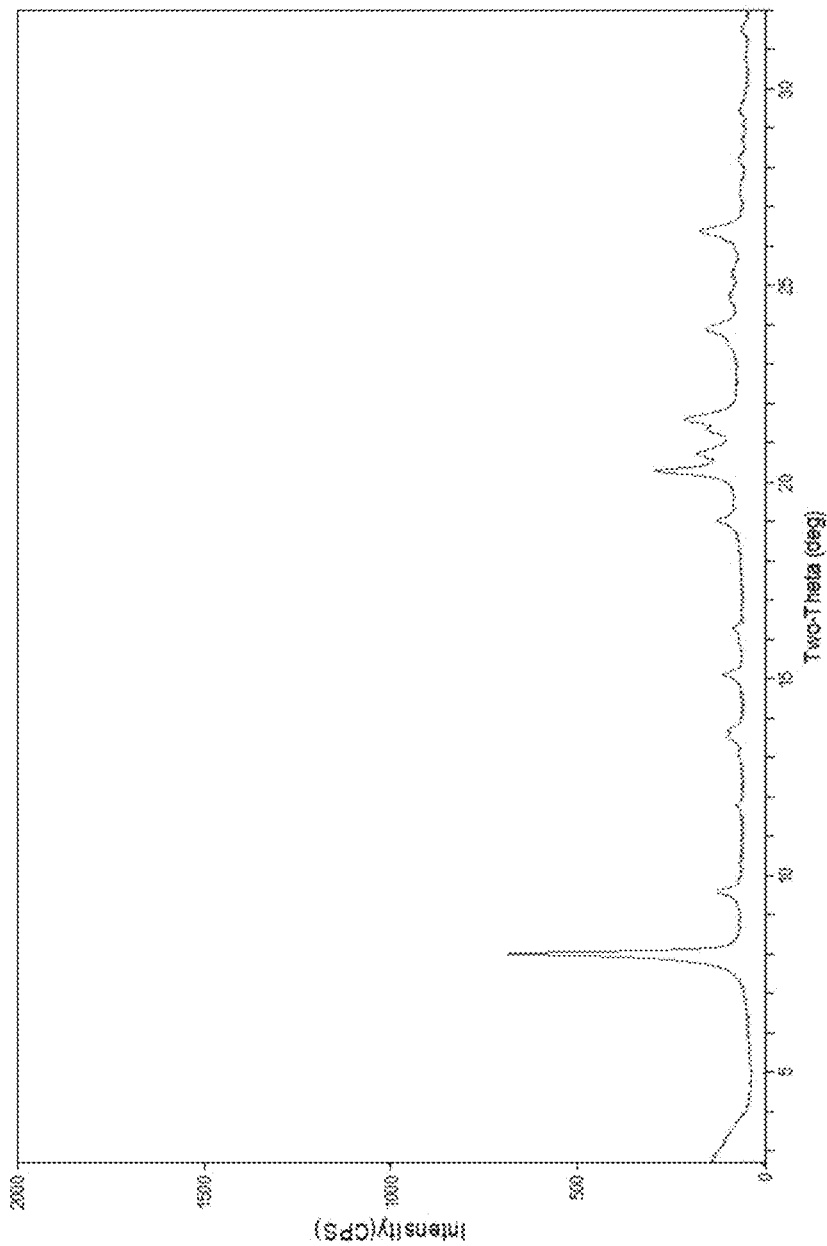
FIG. 6 shows a powder XRD pattern of all-silica SSZ-42 prepared according to Example 6.

The powder XRD pattern of the resulting calcined all-silica product is shown in FIG. 6 and indicated that the resulting calcined all-silica product retained the XRD pattern characteristic of crystalline SSZ-42.

The calcined all-silica SSZ-42 zeolite had a micropore volume of 0.1796 cm$^3$/g.

The calcined all-silica SSZ-42 zeolite exhibited a TGA weight loss of 4.7% at 600° C. relative to its initial weight at the onset of the TGA measurement at ambient temperature, indicating that this material is quite hydrophobic when compared to its parent material—the deboronated SSZ-42 sample of Example 5.

Example 7

Preparation of Deboronated SSZ-53

Calcined borosilicate Na/SSZ-53 powder (7.7 g) which was free of organotemplate and had a molar SiO$_2$/B$_2$O$_3$ ratio of 64 was treated with aqueous 0.01N HCl (388.5 mL) at room temperature for 48 hours. After treatment, the solid was filtered, washed with deionized water, and air-dried in a vacuum filter at room temperature. The material was then exposed to air at room temperature for at least 48 hours.

Figure 7:
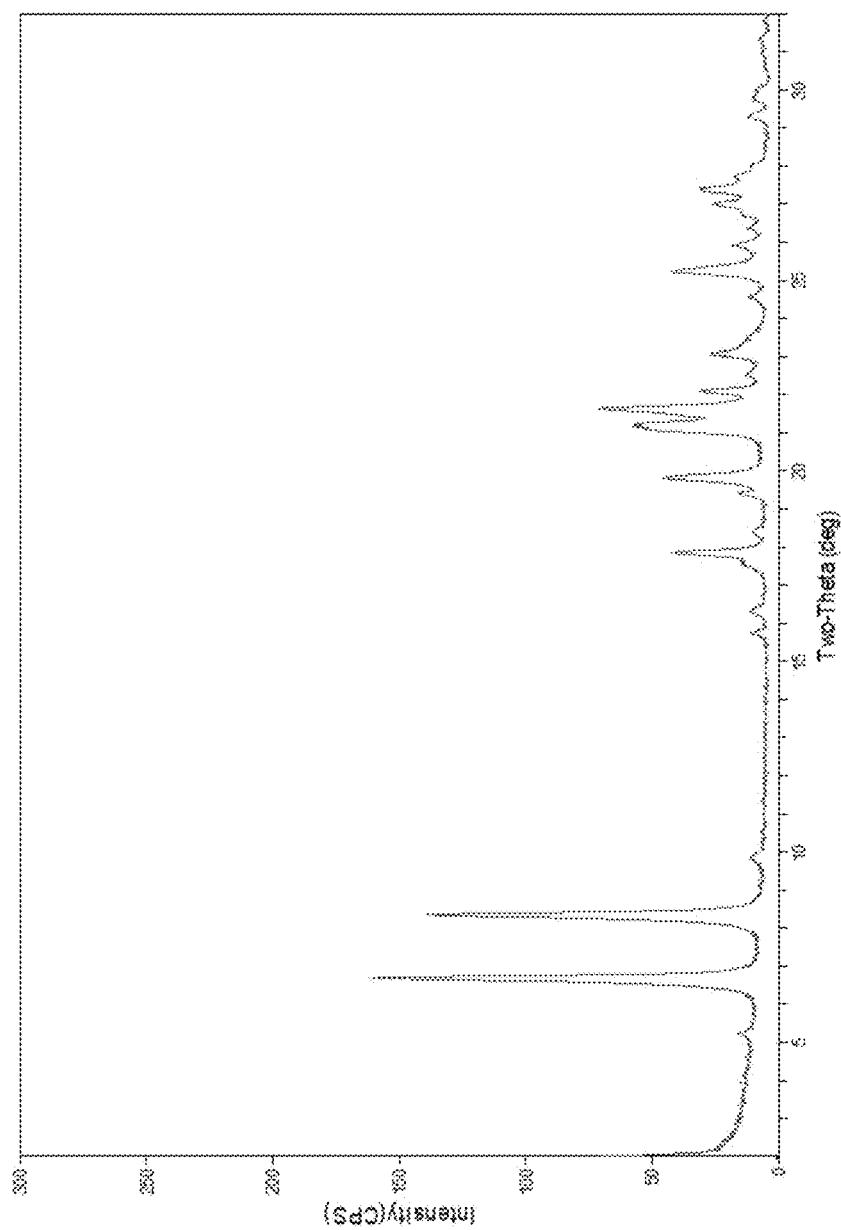
FIG. 7 shows a powder XRD pattern of deboronated SSZ-53 prepared according to Example 7.

The powder XRD pattern of the deboronated product is shown in FIG. 7 and indicated that the deboronated product retained the XRD pattern characteristic of crystalline SSZ-53.

Deboronated SSZ-53 zeolite had a micropore volume of 0.1469 cm$^3$/g and its boron content was below the detection limit (0.01 wt. %).

The deboronated product exhibited a TGA weight loss of 6.6% at 600° C. relative to its initial weight at the onset of the TGA measurement at ambient temperature.

Example 8

Preparation of Hydrophobic all-Silica SSZ-53

The as-prepared deboronated SSZ-53 of Example 7 was calcined inside a muffle furnace under a flow of air heated to 950° C. at a rate of 1° C./minute and held at 950° C. for 5 hours. The material was then exposed to air for at least 48 hours.

Figure 8:
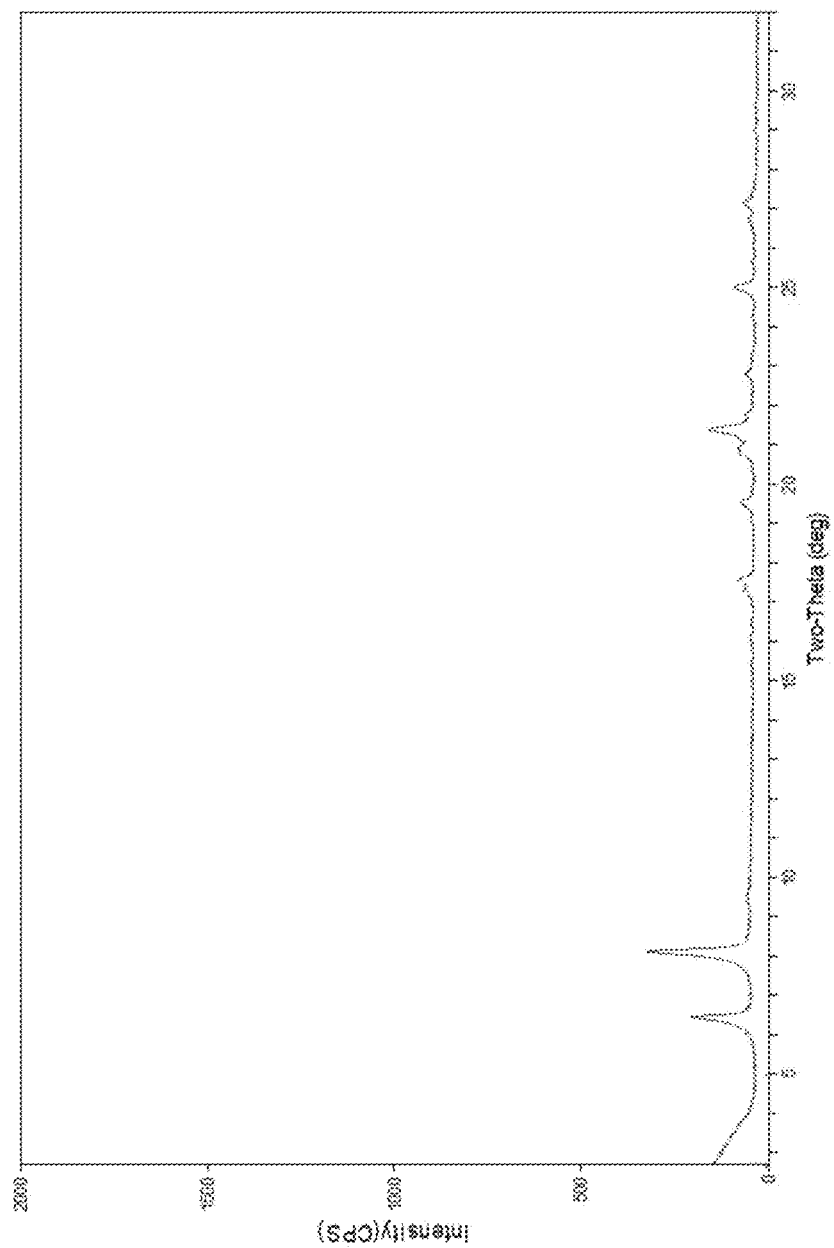
FIG. 8 shows a powder XRD pattern of all-silica SSZ-53 prepared according to Example 8.

The powder XRD pattern of the resulting calcined all-silica product is shown in FIG. 8 and indicated that the resulting calcined all-silica product retained the XRD pattern characteristic of crystalline SSZ-53.

The calcined all-silica SSZ-53 zeolite had a micropore volume of 0.1530 cm$^3$/g.

The calcined all-silica SSZ-53 zeolite exhibited a TGA weight loss of 1.1% at 600° C. relative to its initial weight at the onset of the TGA measurement at ambient temperature, indicating that this material is quite hydrophobic when compared to its parent material—the deboronated SSZ-53 sample of Example 7.

Example 9

Preparation of Deboronated SSZ-57

Calcined borosilicate Na/SSZ-57 powder (7.6 g) which was free of organotemplate and had a molar SiO$_2$/B$_2$O$_3$ ratio of 102 was treated with aqueous 0.01N HCl (375.5 mL) at room temperature for 48 hours. After treatment, the solid was filtered, washed with deionized water, and air-dried in a vacuum filter at room temperature. The material was then exposed to air at room temperature for at least 48 hours.

Figure 9:
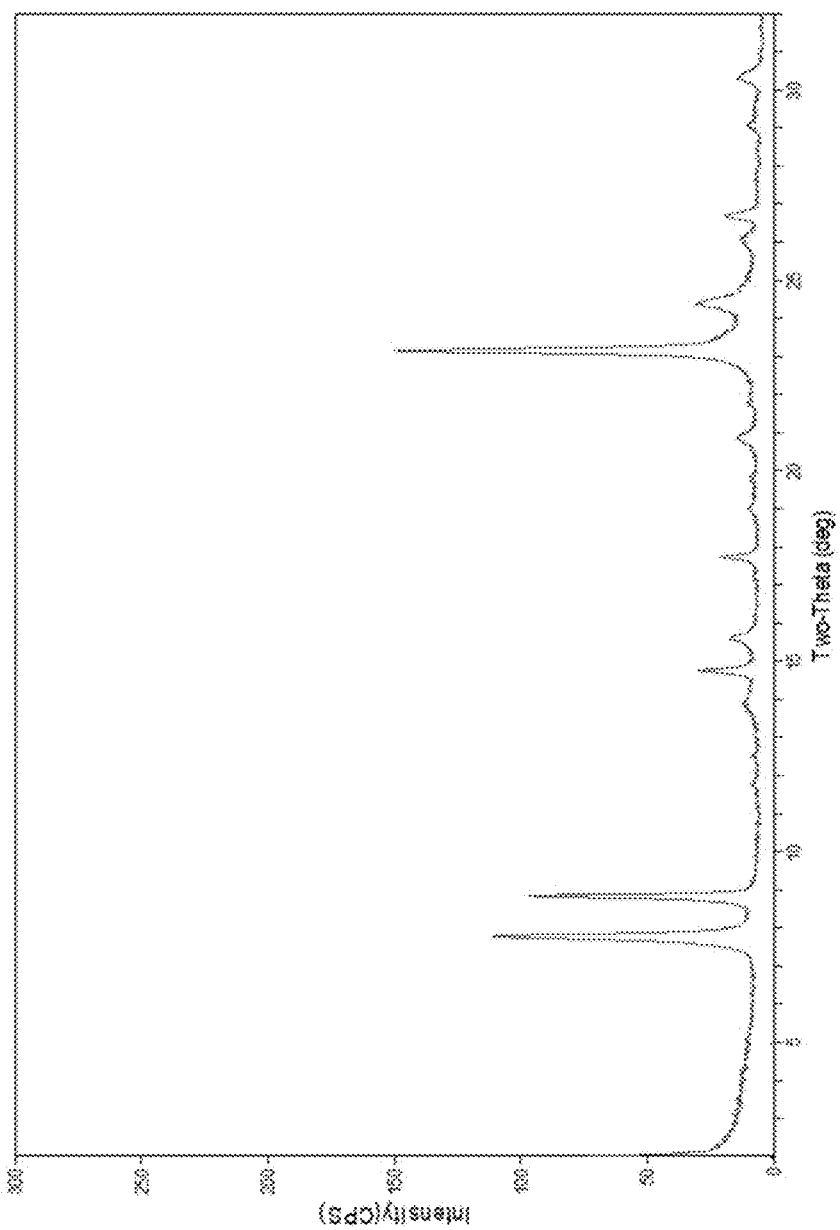
FIG. 9 shows a powder XRD pattern of deboronated SSZ-57 prepared according to Example 9.

The powder XRD pattern of the deboronated product is shown in FIG. 9 and indicated that the deboronated product retained the XRD pattern characteristic of crystalline SSZ-57.

Deboronated SSZ-57 zeolite had a micropore volume of 0.1533 cm$^3$/g and its boron content was below the detection limit (0.01 wt. %).

The deboronated product exhibited a TGA weight loss of 8.2% at 600° C. relative to its initial weight at the onset of the TGA measurement at ambient temperature.

Example 10

Preparation of Hydrophobic all-Silica SSZ-57

The as-prepared deboronated SSZ-57 of Example 9 was calcined inside a muffle furnace under a flow of air heated to 950° C. at a rate of 1° C./minute and held at 950° C. for 5 hours. The material was then exposed to air for at least 48 hours.

Figure 10:
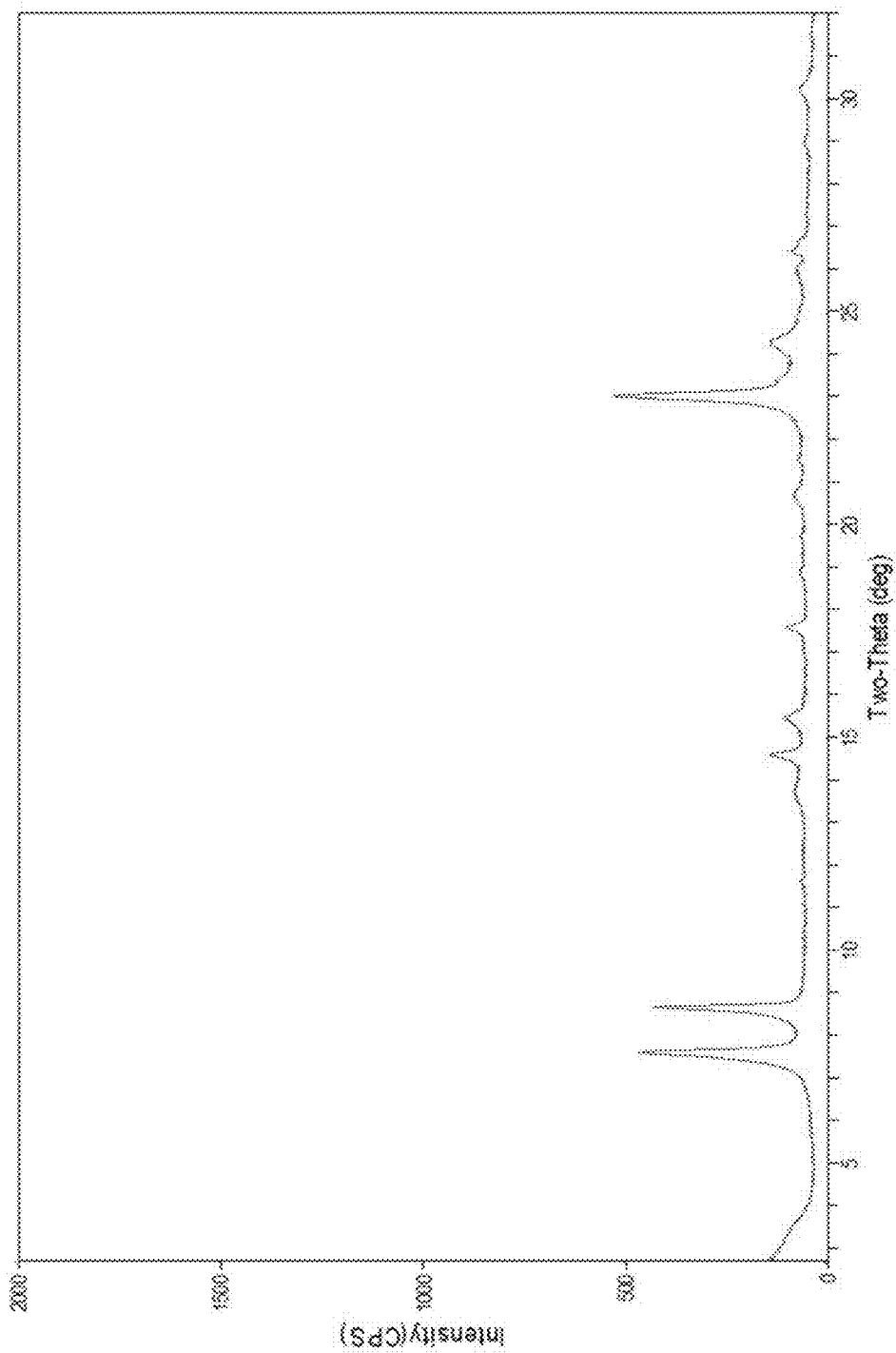
FIG. 10 shows a powder XRD pattern of all-silica SSZ-57 prepared according to Example 10.

The powder XRD pattern of the resulting calcined all-silica product is shown in FIG. 10 and indicated that the resulting calcined all-silica product retained the XRD pattern characteristic of crystalline SSZ-57.

The calcined all-silica SSZ-57 zeolite had a micropore volume of 0.1500 cm$^3$/g.

The calcined all-silica SSZ-57 zeolite exhibited a TGA weight loss of 3.6% at 600° C. relative to its initial weight at the onset of the TGA measurement at ambient temperature, indicating that this material is quite hydrophobic when compared to its parent material—the deboronated SSZ-57 sample of Example 9.

The invention claimed is:

1. A method of increasing hydrophobicity of a molecular sieve, the method comprising the steps of:
    (a) providing a metallosilicate molecular sieve having a three-dimensional framework structure comprising oxides of silicon (Si) and a metal (M), wherein M is boron or zinc;
    (b) contacting the metallosilicate molecular sieve with a liquid aqueous system, thereby obtaining a demetallated molecular sieve having silanol nests and empty framework sites, wherein the liquid aqueous system comprises a basic compound; and
    (c) thermally treating the demetallated molecular sieve, thereby obtaining a thermally-treated molecular sieve, wherein the thermally-treated molecular sieve (i) retains the three-dimensional framework structure of the metallosilicate molecular sieve and (ii) has a higher Si/M molar ratio as compared to the metallosilicate molecular sieve.

2. The method of claim 1, wherein the metallosilicate molecular sieve provided in step (a) is a borosilicate molecular sieve having a molar ratio of SiO$_2$/B$_2$O$_3$ of at least 4.

3. The method of claim 1, wherein the metallosilicate molecular sieve provided in step (a) is a borosilicate molecular sieve having a framework type selected from the group consisting of ATS, *BEA, CHA, CON, IFR, IFW, IHW, ITE, ITH, ITW, MEL, MFI, MTT, MTW, *MRE, MVY, MWW, NES, RTH, RUT, SEW, SFE, SFF, SFG, SFH, SFN, SFS, *SFV, SSF, SSY, *STO, STT, and *-SVY.

4. The method of claim 1, wherein the metallosilicate molecular sieve provided in step (a) is a borosilicate molecular sieve having a framework structure selected from the group consisting of EMM-25, EMM-30, SSZ-36, SSZ-37, SSZ-43, SSZ-47, SSZ-63, and SSZ-64.

5. The method of claim 1, wherein the borosilicate molecular sieve provided in step (a) has a framework type selected from the group consisting of IFR, MFI, MTW, SFH, and *SFV.

6. The method of claim 1, wherein the metallosilicate molecular sieve provided in step (a) is a zincosilicate molecular sieve having a molar ratio SiO$_2$/ZnO of at least 10.

7. The method of claim 1, wherein the metallosilicate molecular sieve provided in step (a) is a zincosilicate molecular sieve having a framework type selected from the group consisting of *BEA, IFR, and VPV.

8. The method of claim 1, wherein a weight ratio of the metallosilicate molecular sieve relative to the liquid aqueous system in step (b) is in a range of 1:1 to 1:100.

9. The method of claim 1, wherein the contacting in step (b) is performed at a temperature of from 15° C. to 200° C.

10. The method of claim 1, wherein the contacting in step (b) is performed for a time period of from 0.1 hour to 1 week.

11. The method of claim 1, wherein the basic compound is an inorganic base, an organic base, or any combination thereof.

12. The method of claim 11, wherein the inorganic base is selected from the group consisting of ammonia, ammonium hydroxide, sodium hydroxide, potassium hydroxide, calcium hydroxide, sodium carbonate, sodium bicarbonate, and any combination thereof.

13. The method of claim 11, wherein the organic base is a C1-C10 organic base.

14. The method of claim 13, wherein the C1-C10 organic base is selected from the group consisting of sodium ethoxide, sodium acetate, methylamine, imidazole, histidine, and any combination thereof.

15. The method of claim 1, wherein a pH of the liquid aqueous system in step (b) is in a range of from 8.5 to 12.

16. The method of claim 1, wherein the thermally treating in step (c) is carried out at a temperature of from 200° C. to 1200° C.

17. The method of claim 1, wherein the thermally treating in step (c) is carried out for a period of from 0.25 to 20 hours.

18. The method of claim 1, wherein the thermally-treated molecular sieve is an all-silica molecular sieve.

* * * * *